L. G. ROWAND.
ELECTRIC FURNACE.
APPLICATION FILED JUNE 5, 1917.

1,289,055.

Patented Dec. 24, 1918.
3 SHEETS—SHEET 1.

INVENTOR
Lewis G. Rowand
BY
Pennie Davis & Marvin
ATTORNEYS

L. G. ROWAND.
ELECTRIC FURNACE.
APPLICATION FILED JUNE 5, 1917.
1,289,055.
Patented Dec. 24, 1918.
13 SHEETS—SHEET 2.
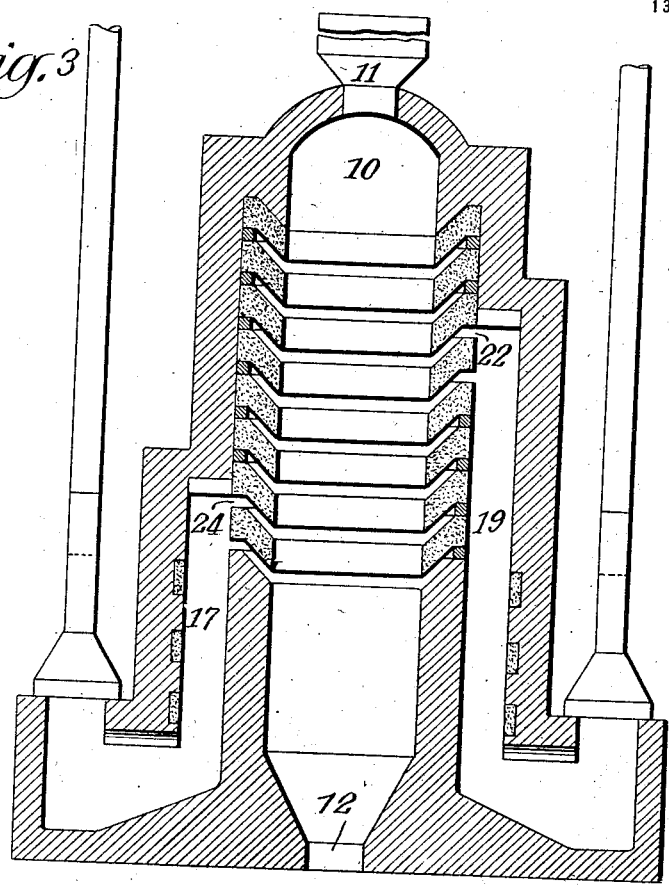
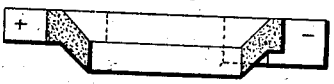
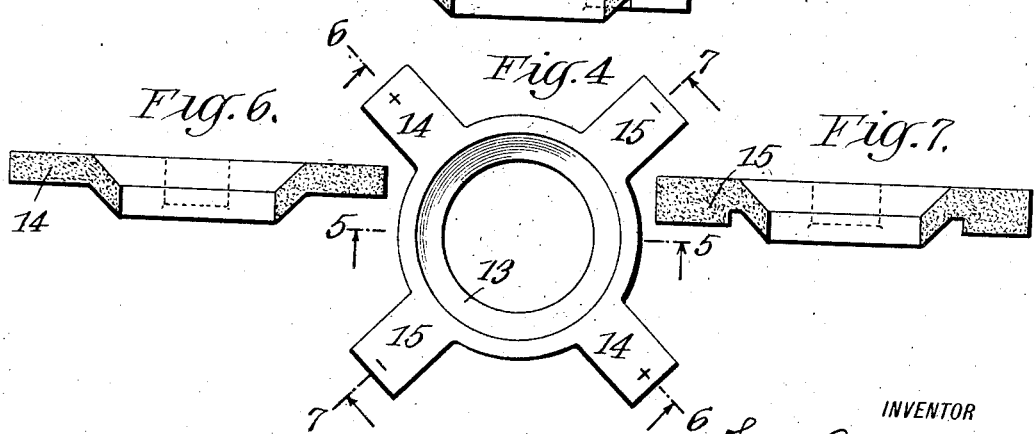
INVENTOR
Lewis G. Rowand
BY
Pennie Davis & Marvin
ATTORNEYS L. G. ROWAND.
ELECTRIC FURNACE.
APPLICATION FILED JUNE 5, 1917.
1,289,055.
Patented Dec. 24, 1918.
13 SHEETS—SHEET 3.
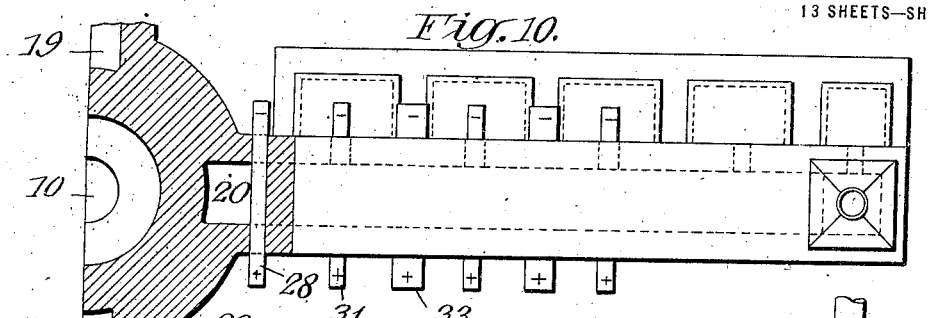
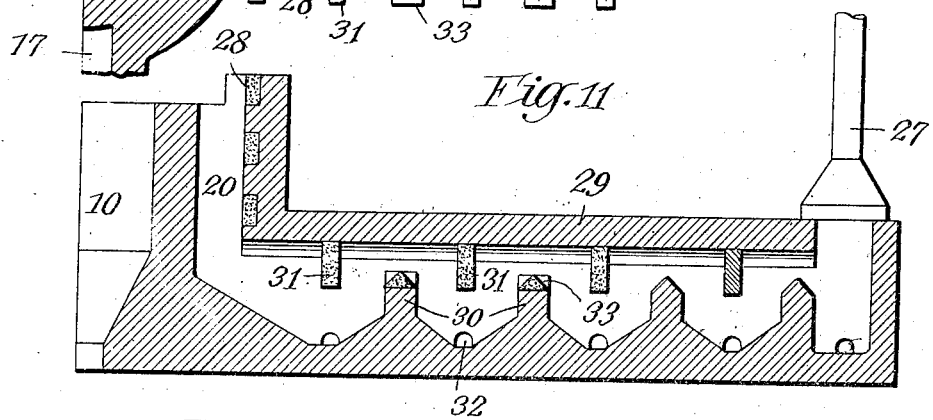
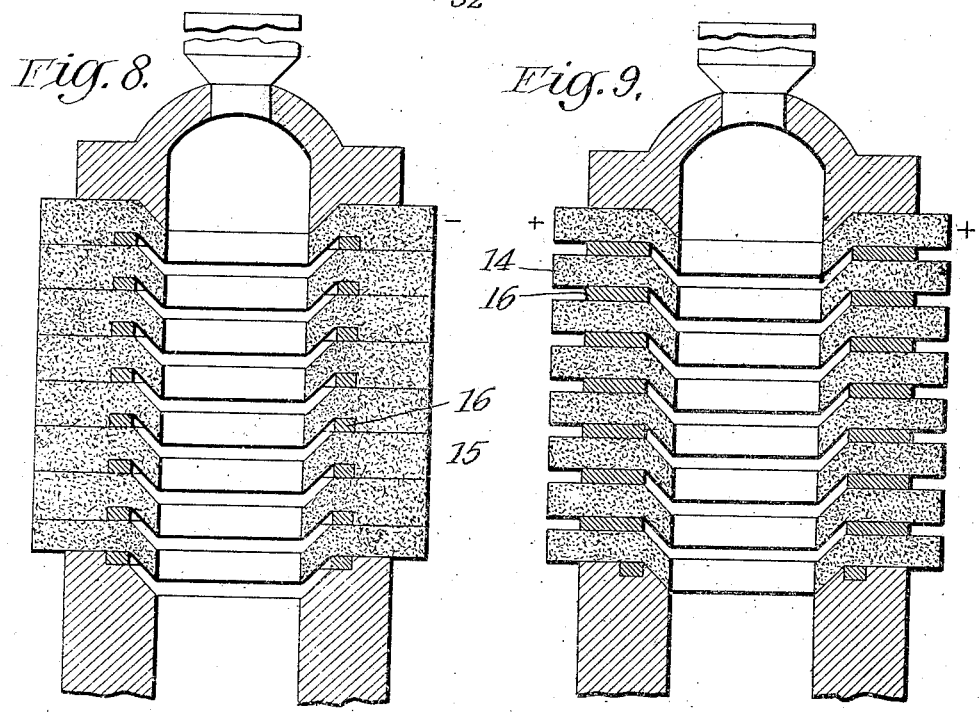
INVENTOR
Lewis G. Rowand
BY
Pennie Davis & Marvin
ATTORNEYS

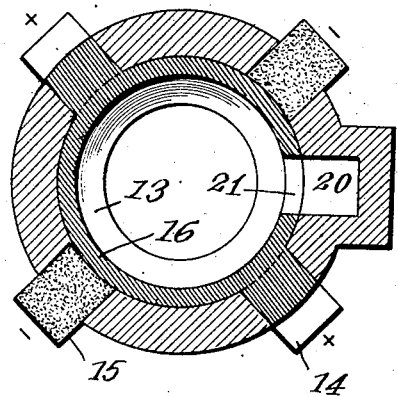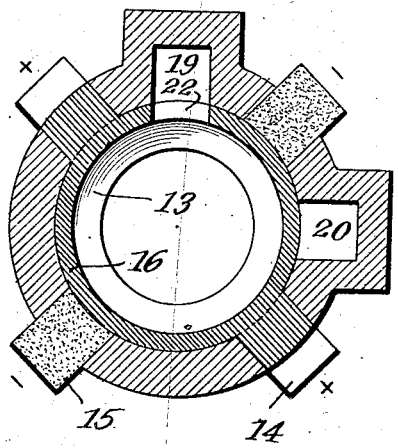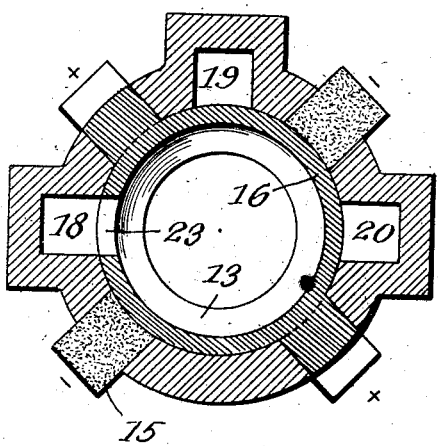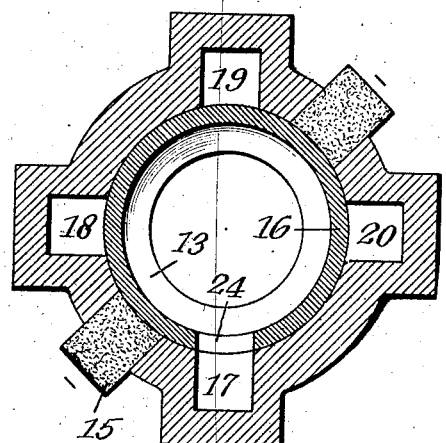

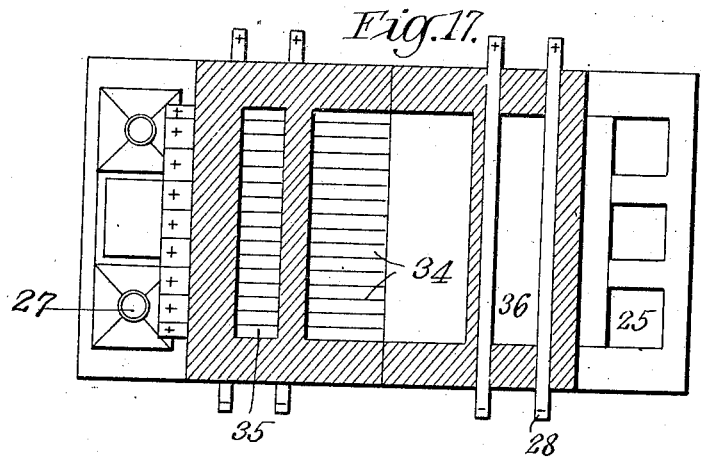
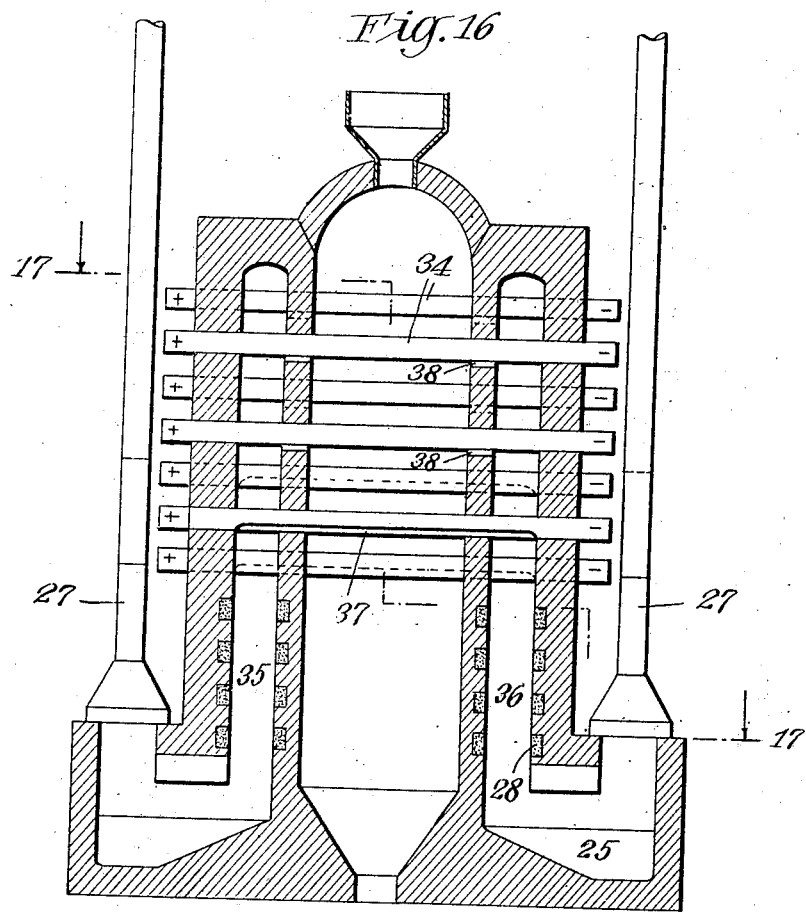

L. G. ROWAND.
ELECTRIC FURNACE.
APPLICATION FILED JUNE 5, 1917.

1,289,055.

Patented Dec. 24, 1918.
13 SHEETS—SHEET 6.

INVENTOR
Lewis G. Rowand
BY
Pennie Davis & Marvin
ATTORNEYS

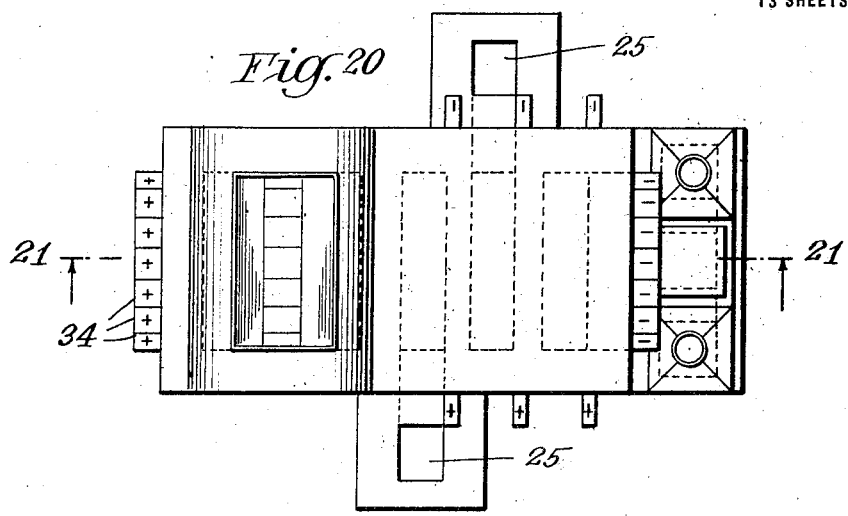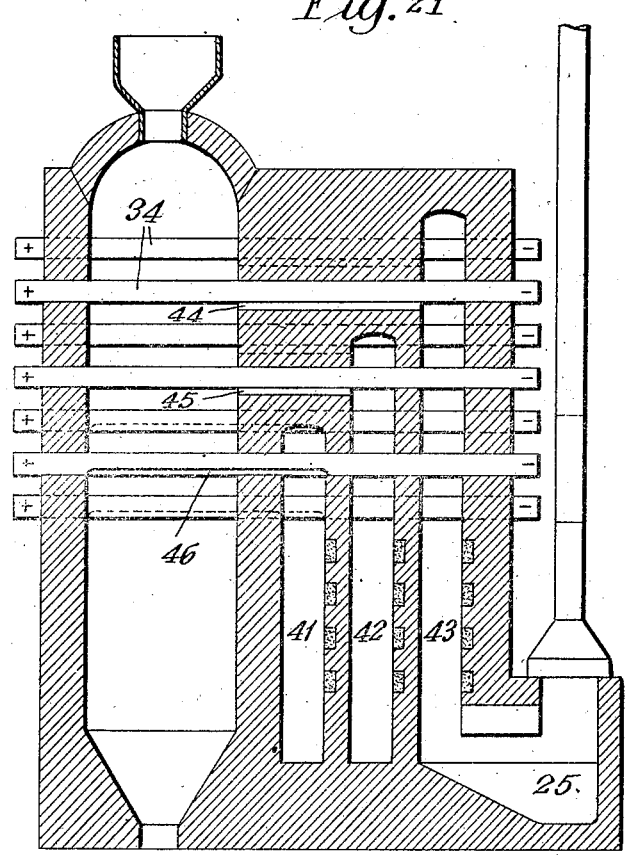

L. G. ROWAND.
ELECTRIC FURNACE.
APPLICATION FILED JUNE 5, 1917.

1,289,055.

Patented Dec. 24, 1918.
13 SHEETS—SHEET 8.

INVENTOR
Lewis G. Rowand
BY
Pennie Davis & Marvin
ATTORNEYS

L. G. ROWAND.
ELECTRIC FURNACE.
APPLICATION FILED JUNE 5.

1,289,055.

Patented Dec. 24, 1918.
13 SHEETS—SHEET 9.

INVENTOR
Lewis G. Rowand.
BY
Pennie Davis + Marvin
ATTORNEYS

L. G. ROWAND.
ELECTRIC FURNACE.
APPLICATION FILED JUNE 5, 1917.

1,289,055.

Patented Dec. 24, 1918.
13 SHEETS—SHEET 10.

INVENTOR
Lewis G. Rowand
BY
Pennie Davis & Marvin
ATTORNEYS

L. G. ROWAND.
ELECTRIC FURNACE.
APPLICATION FILED JUNE 5, 1917.

1,289,055.

Patented Dec. 24, 1918.
13 SHEETS—SHEET 11.

INVENTOR
Lewis G. Rowand
BY
Pennie Davis & Marvin
ATTORNEYS

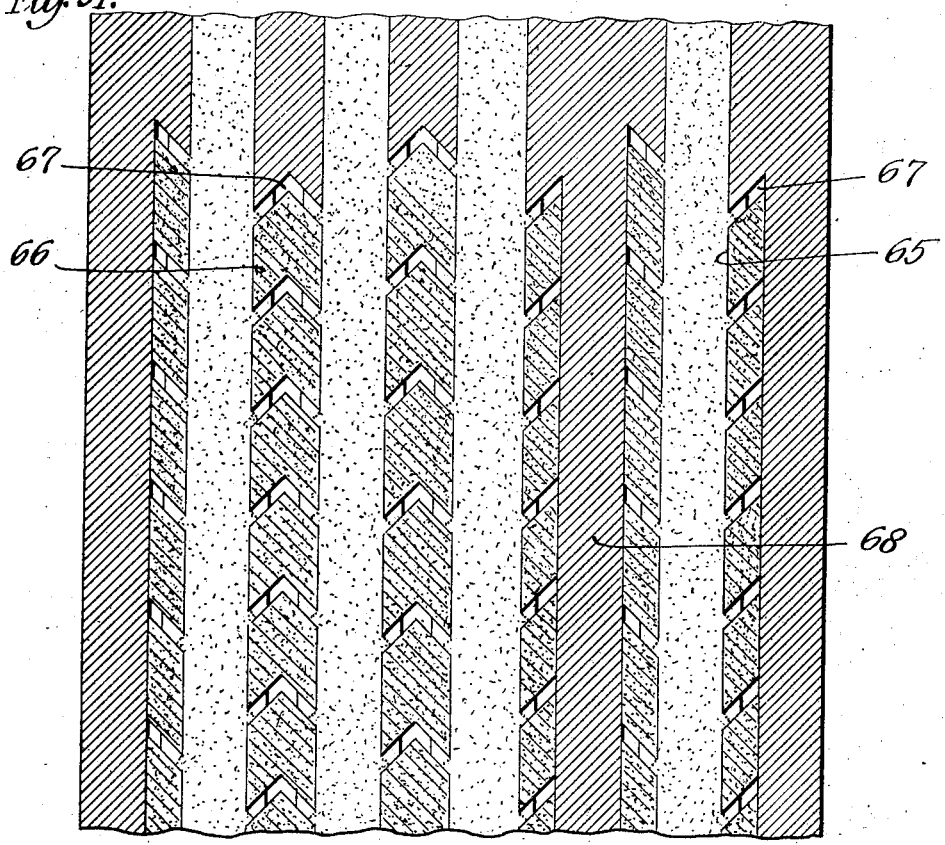
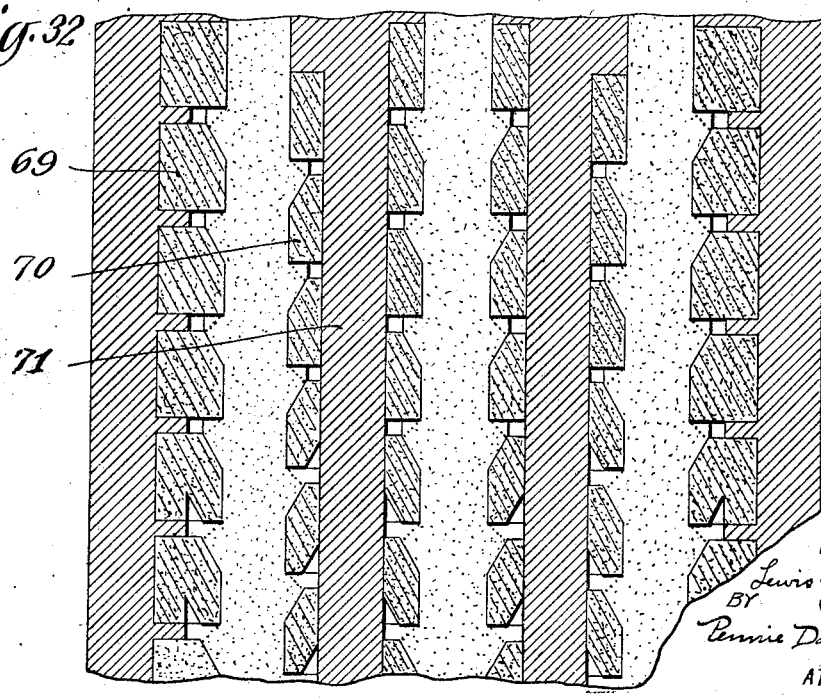

L. G. ROWAND.
ELECTRIC FURNACE.
APPLICATION FILED JUNE 5, 1917.

1,289,055.

Patented Dec. 24, 1918.
13 SHEETS—SHEET 13.

INVENTOR
Lewis G. Rowand
BY
Pennie Davis & Marvin
ATTORNEYS

UNITED STATES PATENT OFFICE.

LEWIS G. ROWAND, OF BROOKLYN, NEW YORK, ASSIGNOR TO NEW JERSEY ZINC COMPANY, OF NEW YORK, N. Y., A CORPORATION OF NEW JERSEY.

ELECTRIC FURNACE.

1,289,055.    Specification of Letters Patent.    Patented Dec. 24, 1918.

Application filed June 5, 1917. Serial No. 172,852.

*To all whom it may concern:*

Be it known that I, LEWIS G. ROWAND, a citizen of the United States, residing in the borough of Brooklyn, county of Kings, and State of New York, have invented certain new and useful Improvements in Electric Furnaces; and I do hereby declare the following to be a full, clear, and exact description of the invention, such as will enable others skilled in the art to which it appertains to make and use the same.

This invention relates to electric furnaces intended principally for use in the reduction, or partial reduction, of metals from their ores, oxids and like compounds.

The object of the invention is, primarily, to provide an electric reducing furnace (particularly for zinc) wherein the reduction may be effected with economy, and wherein a relatively large output is obtainable under conditions which are less trying to the furnacemen than is usual in the ordinary practice.

The invention involves the provision of a furnace through which the charge is passed continuously or intermittently from the admission end to the discharge end thereof, the furnace being preferably disposed vertically and the charge being moved downwardly by gravity as the treatment progresses and as the residue is withdrawn from the lower discharge end of the furnace. A plurality of resistors, *i. e.*, electric conductors of suitable resistivity, are provided for heating the charge during its passage through the furnace, these conductors being arranged one above another so that the portion of the charge which is heated is of substantial extent in the vertical direction. The wall of the furnace is also provided with outlets for the passage of volatile products given off by the ore when the latter is heated, and suitable flues are arranged to conduct these products into condensing apparatus in which their condensable constituents are recovered.

The ores from which zinc is obtained frequently contain other metals such as lead and iron. When the ore is heated, the lead is volatilized in the early stages of the treatment and the lead vapors mix with zinc vapors given off at that stage and lessen the value of the spelter resulting from the condensation. Furthermore, if the heat treatment raises the temperature of the ore high enough, some of the iron content of the ore will be volatilized and pass off with the zinc. Because of these characteristics of the ore and the heat treatment thereof, it is desirable to segregate the product obtained at different stages of the operation of reducing the ore. I have therefore provided my improved furnace with a plurality of condensers each of which has a flue which is so connected to the interior of the furnace as to draw vapor from a predetermined zone or level thereof. In this way the condensations from the different furnace zones are kept separate and the spelter from the intermediate zone or zones, is free from lead and free from iron and of high quality. Special means may also be provided for preventing too rapid cooling of the vapor.

In the accompanying drawings—

Fig. 3 is a similar section on the line 3—3 of Fig. 1;

Fig. 4 is a plan view of one of the heating conductors;

Figure 1:
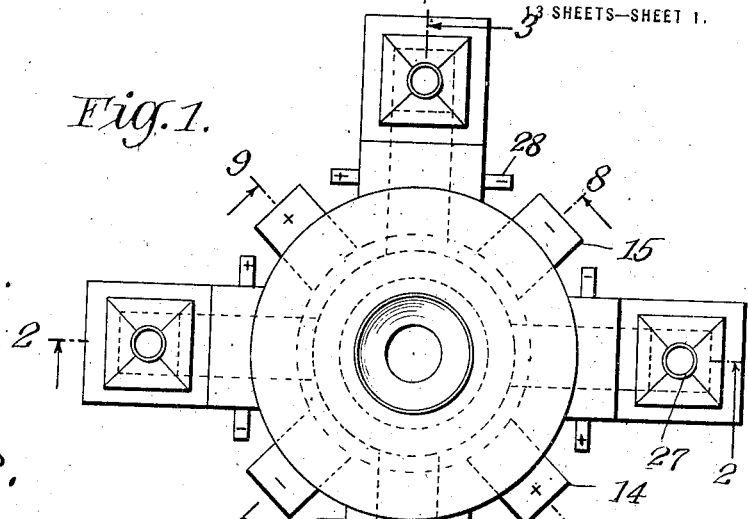
Figure 1 is a top view of a furnace embodying the present invention.
Figure 2:
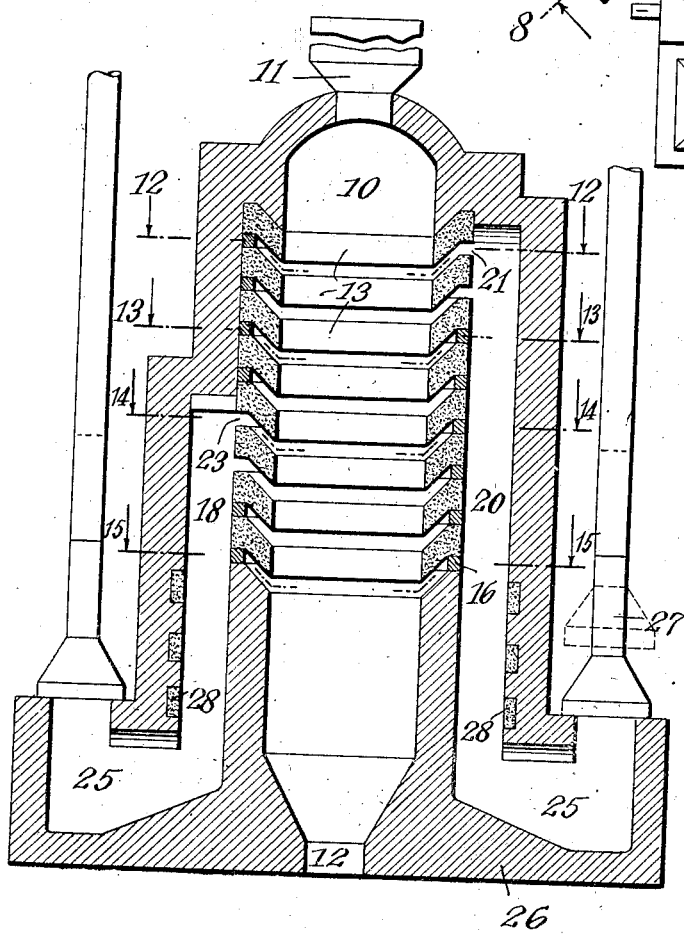
Fig. 2 is a vertical section on the line 2—2 of Fig. 1.
Figure 18:
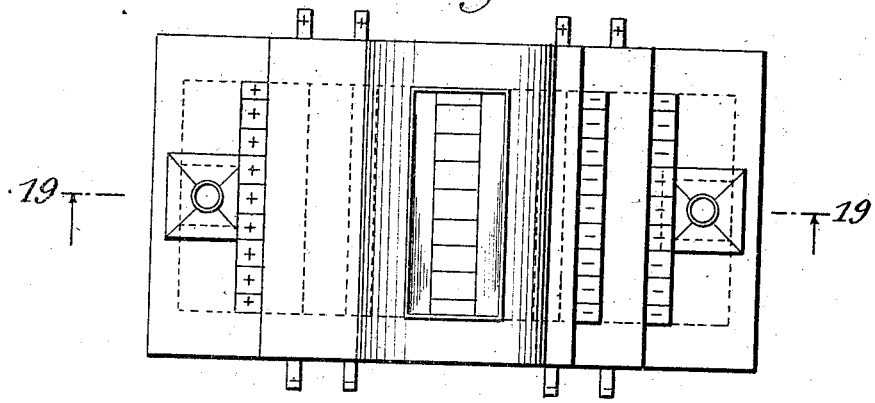
Figure 19:
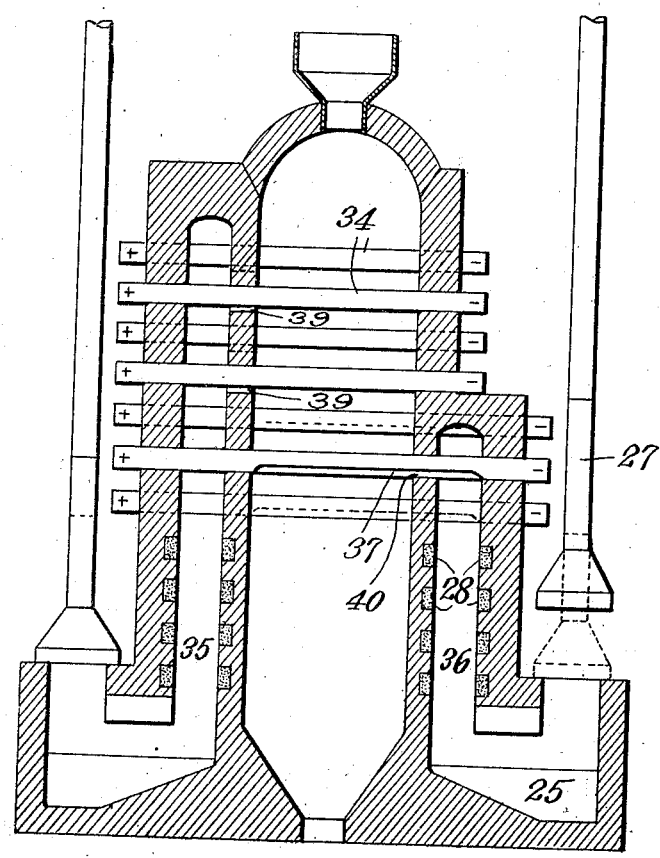
Figure 22:
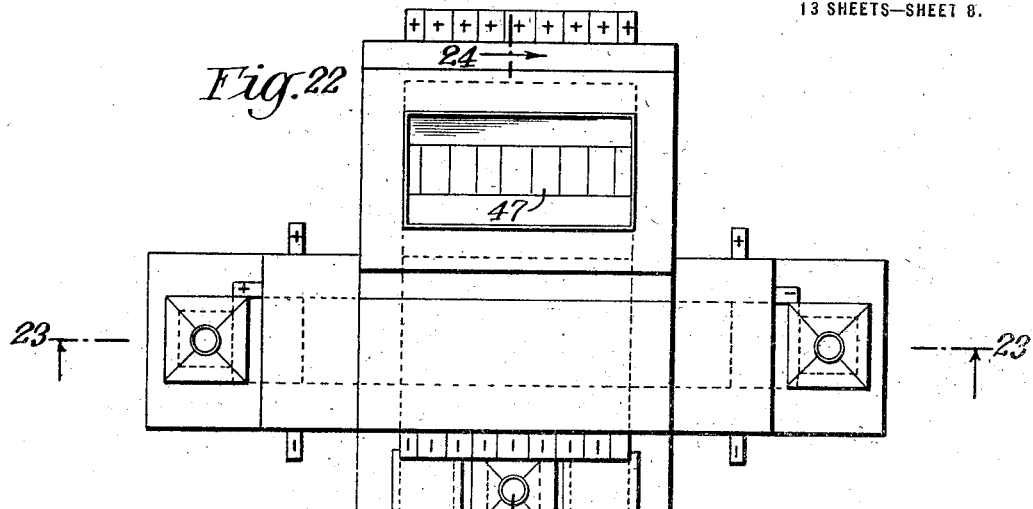
Figure 23:
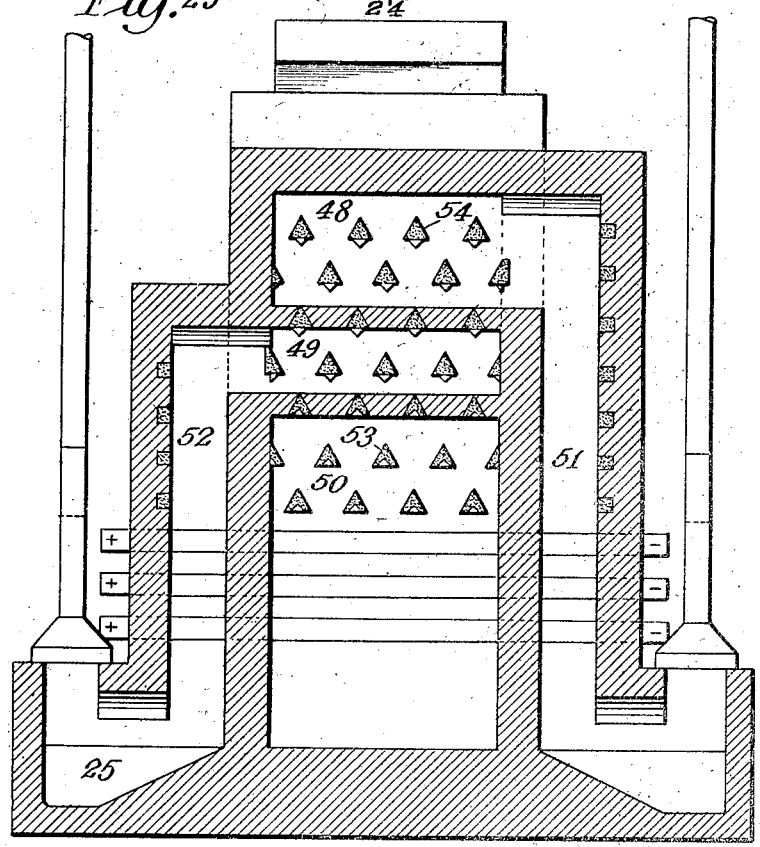
Figure 24:
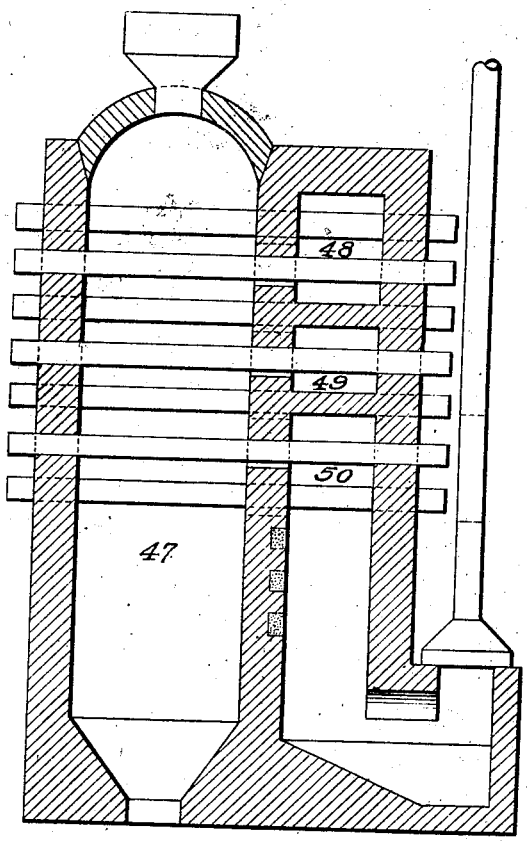
Figure 27:
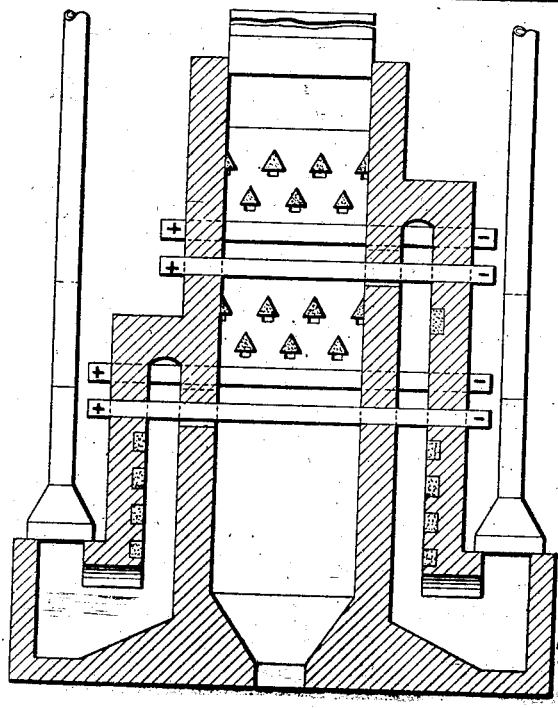
Figure 25:
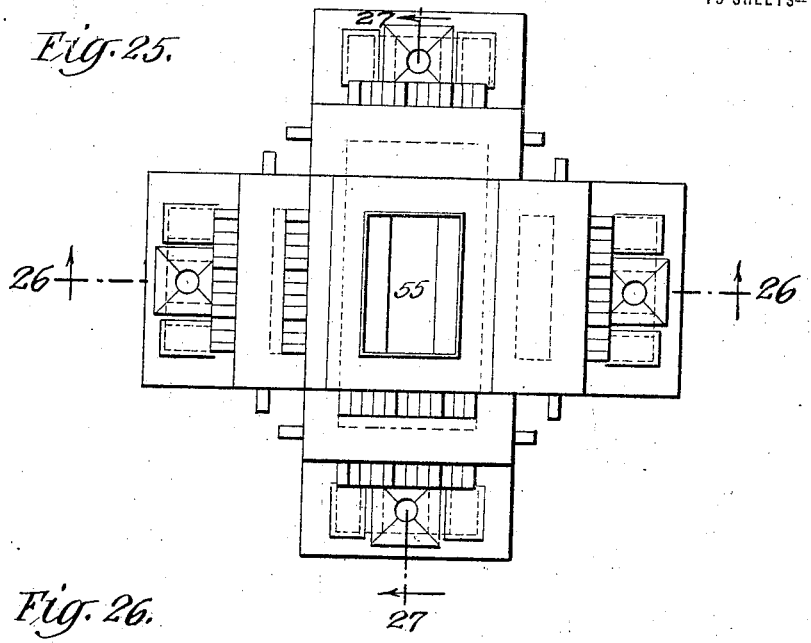
Figure 26:
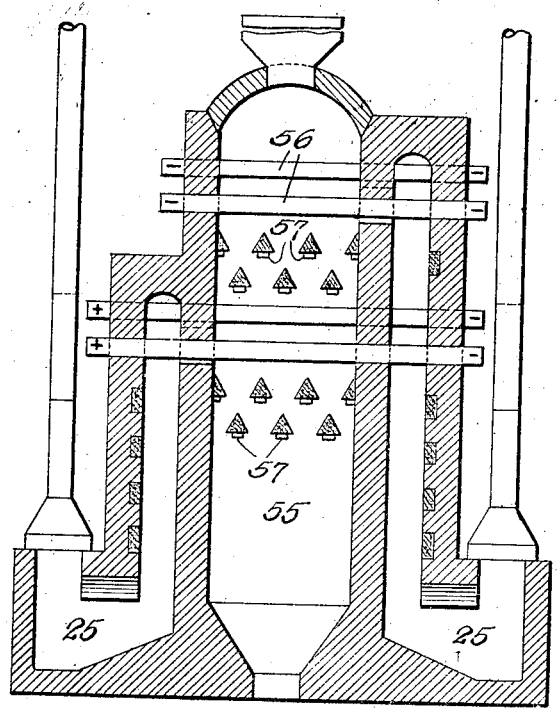
Figure 28:
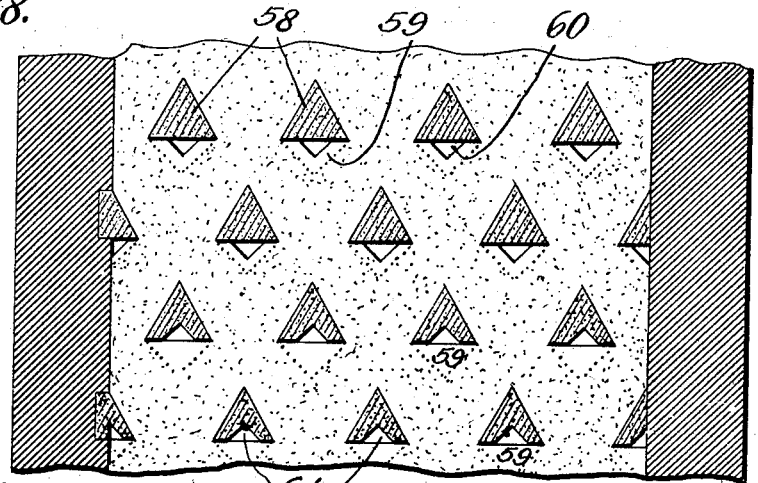
Figure 29:
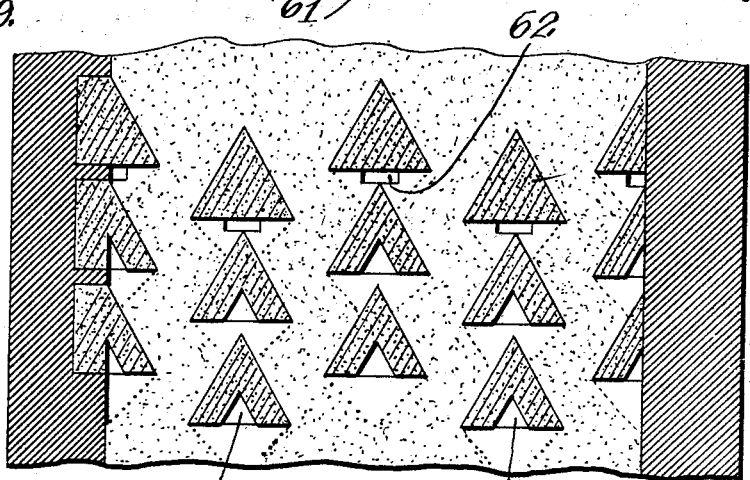

Figs. 5, 6 and 7 are sections on the lines 5—5, 6—6 and 7—7, respectively, of Fig. 4;

Figs. 8 and 9 are vertical sections on the lines 8—8 and 9—9 of Fig. 1;

Fig. 10 is a top view of a form of condenser differing from that shown in Figs. 2 and 3, a portion of the furnace being shown in horizontal section;

Fig. 11 is a vertical section of the condenser shown in Fig. 10;

Figs. 12, 13, 14 and 15 are horizontal sections on the lines 12—12, 13—13, 14—14 and 15—15 of Fig. 2;

Fig. 16 is a vertical section of a modified form of furnace;

Fig. 17 is a horizontal section on the line 17—17 of Fig. 16;

Fig. 18 is a plan view of another modified form of furnace;

Fig. 19 is a vertical section on the line 19—19 of Fig. 18;

Fig. 20 is a plan view of another modification;

Fig. 21 is a vertical section on the line 21—21 of Fig. 20;

Fig. 22 is a plan view of a further modification;

Fig. 23 is a vertical section on the line 23—23 of Fig. 22;

Fig. 24 is a vertical section on the line 24—24 of Fig. 22;

Fig. 25 is a plan view of a furnace having a rectangular heating chamber with four condenser flues symmetrically disposed about the chamber and communicating with it at four different levels;

Fig. 26 is a vertical section on the line 26—26 of Fig. 25;

Fig. 27 is a vertical section on the line 27—27 of Fig. 25;

Figs. 28 and 29 show resistors of triangular cross-section and with variations in the form and position of the vapor vents, these features being variously applicable to the types of furnaces illustrated more particularly in Figs. 16 to 17 inclusive.

Figure 30:
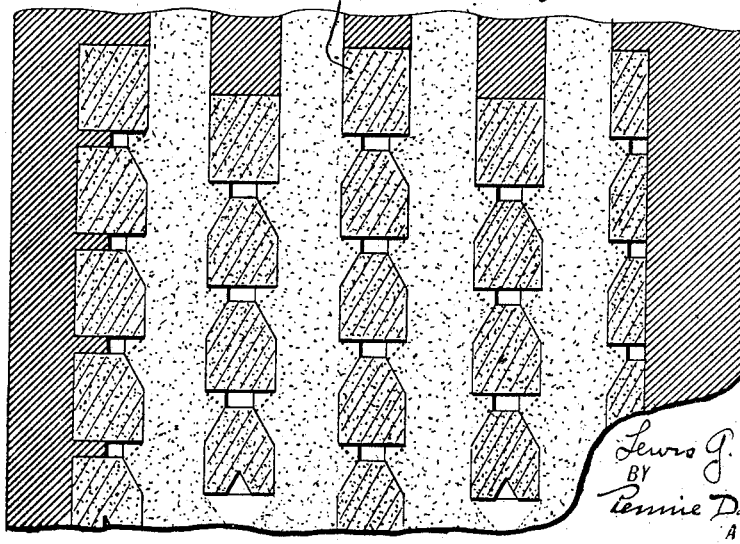
Figure 33:
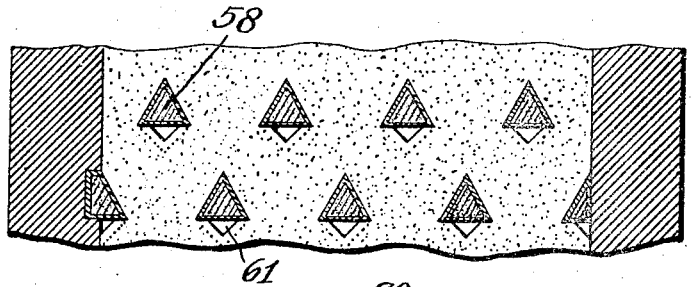
Figure 34:
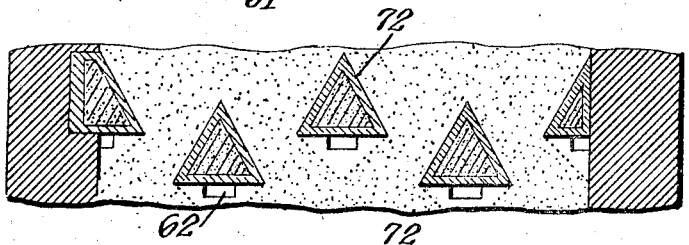
Figure 35:
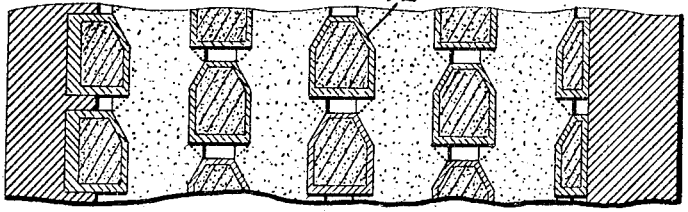
Figure 36:
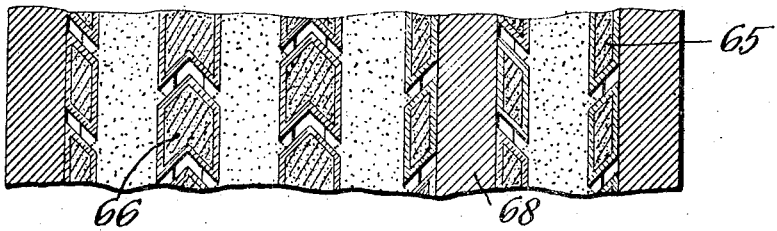
Figure 37:
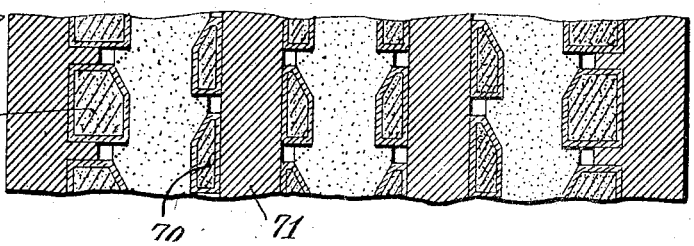

Fig. 30 illustrates in section other forms of resistors of rectangular outline but with beveled top edges and suitable for use in the modified forms of furnaces illustrated in Figs. 16 to 27 inclusive;

Figs. 31 and 32 illustrate in section other forms of resistors with vapor vents variously positioned, these various features being applicable to said modified types of furnaces;

Figs. 33 to 37, inclusive, illustrate in section still further permissible modifications in the shape and relative positions of the furnace resistors, some of the resistors being in staggered relation to one another, as in Fig. 33, and some being in off-set relation, as in Fig. 34, and others being disposed in tiers, as in Figs. 35, 36 and 37, but all covered with a refractory envelop to limit oxidation and mechanical wear of the resistors. These Figs. 33 to 37 also illustrate permissible variations of form and location of the vapor vents.

Referring first to Figs. 1 to 15, inclusive, the furnace includes a vertically disposed chamber 10 of cylindrical form, having an admission opening 11 at its upper end, and a discharge opening 12 at its lower end. These openings are provided with suitable closures and preferably with apparatus whereby the ore is automatically admitted at the inlet 11 in suitable quantities and at suitable periods, and the residue correspondingly discharged from the outlet 12, thus causing the ore within the furnace chamber 10 to move downward at a predetermined and appropriate rate. The upper and lower parts of chamber 10 are of masonry and the flues leading from said chamber, and also the condensing chamber, may be of masonry, but the intermediate portion of chamber 10 is formed by a plurality of electric resistors 13 through which the electric current may be passed from a suitable source, to heat the ore during its progress toward the outlet.

The resistors or heating conductors may be of annular form, as shown in Figs. 4 to 7, and may be stacked one above another on the masonry foundation, as shown in Fig. 2, so as to completely encircle the space through which the ore passes. These conductors or resistors are preferably made from a moldable non-metallic substance which is electro-conductive, but of relatively high resistance, and which possesses good radiating qualities. I may employ a composition containing carbon, calcined carbonate of magnesium, and a binder such as molasses, tar, or the like, or I may employ carbon alone united by a suitable binder, or in solid form without a binder, as for instance, graphite, say Acheson graphite.

As shown in Fig. 4, each resistor 13 is annular in form and has four radial projections spaced apart equally around its periphery. Two of these projections are designated 14 and the other two 15. Preferably the inner portion of resistor 13 is depressed or inclined downwardly, as shown in Figs. 5 to 7. Projections 14 are preferably of less thickness than projections 15, as shown in Figs. 6 and 7. When these resistors are stacked one above another with suitable spacers 16 between them, adjacent projections 15 will be in electrical contact, as shown in Fig. 8, but adjacent projections 14 will be spaced apart and insulated from one another, as shown in Fig. 9. All of the projections are long enough to extend beyond the masonry wall of the furnace so that conductors leading from a source of electric current may be connected thereto.

Within the wall of the furnace are a plurality of vertically disposed flues 17, 18, 19 and 20 of varying heights, each of which communicates at its upper end with the interior of the furnace. Communication between the upper end of each flue and the interior of the furnace is preferably provided by cutting away a portion of one, or preferably two, of the annular insulating spacers 16, as indicated in Figs. 12 to 15, for a distance equal to the width of the flue, as indicated at 21, 22, 23 and 24, for flues 20, 19, 18 and 17, respectively. The heated portion of chamber 10 may therefore be regarded as divided into four distinct zones each having its own outlet flue.

Each of the flues 17, 18, 19 and 20 terminates at its lower end in a condenser 25 formed in the base 26 of the furnace, and in these condensers, the vapors distilled off from the ore and passing out through the ports and downward through the flues above described, are condensed. Each condenser is provided with a stack 27 through which gases and uncondensing materials may pass off. Each stack is of telescopic construction to permit ladling of the spelter from the condenser.

In the operation of the apparatus, it is important that the vapors passing from the furnace into the condensers shall not be cooled too rapidly, and I have therefore provided a plurality of resistors or heating conductors 28 embedded in the walls of each flue near its lower end where they may serve to keep the vapors hot until they reach the condenser. These resistors 28 have their ends projecting through the masonry walls, as shown in Fig. 1, for connection to a source of electric current.

In the operation of the apparatus, the charge of zinc, ore or oxid or like compound, and carbon, is introduced into the upper end of the furnace chamber 10, and the residue is correspondingly discharged at the lower outlet 12. Continuous feeding is preferred. The proportion of carbon may be the same as that usually employed in gas heated furnaces for the reduction of the particular ore, oxid or like compound, under treatment, or may be greater or less, as circumstances may dictate. In working with zinc ores, this carbon serves as a reducing agent. The proportion of carbon in the charge is preferably kept as low as is consistent with the metallurgical operation to be carried out, so that current may not be needlessly shunted from the resistors by the conductive carbon component of the charge.

The electrical connections for each resistor 13 are preferably such that current flows in at projections 14 and out at projections 15, its flow from each projection 14 being divided between the two projections 15. High amperage may be used, and the resistors or conductors thereby heated radiate their heat to the charge while it is passing slowly and progressively downward through chamber 10. The passage of the current through the charge itself is not desired and need not occur to any considerable extent.

Adjacent projections 15 are in contact, as shown in Fig. 8, and so must be at the same electrical potential, but by using separate supply conductors for projections 14 with suitable regulators interposed between these projections and the source of current, it is possible independently to regulate the current flow in each resistor and thereby control the temperature at any particular zone of the heating chamber. There is thereby given to the furnace a certain flexibility of control which I regard as desirable. The heating current is such that the resistors will radiate to the charge an amount of energy sufficient to effect reduction and volatilization of the zinc, but not enough to cause volatilization of any substantial amount of the iron that may be present in the ore. If the ore contains lead, it will be volatilized in the early stages of the heat treatment, i. e., while in the region of the two uppermost resistors 13. The lead vapor will therefore pass off through the ports 21 along with such zinc vapor as is distilled off at this stage of the operation, and this mixture of vapors will pass downward through flue 20 to condenser 25 where it will condense to form a spelter of relatively low grade because of the presence of lead.

Substantially all of the lead content will be driven off at this upper or less heated zone of the heating chamber. The vapors generated at the second or next hottest zone, in the progress of the charge through the furnace, will pass out through outlets 22 entering flue 19 and passing to the condenser at the base of that flue. The spelter formed by condensation in this condenser will be practically pure. The same is true for condensations from flue 18.

As the heat treatment is continued and the charge moves downwardly, its temperature can be raised to such a point as to cause volatilization of iron contained in the charge. It is therefore desirable to segregate the vapor obtained in the final stages of the heating process or from the charge while in the hottest zone of the heating chamber. In this furnace, where the hottest zone is located near the lowermost resistors 13, such iron vapor as is liberated comes off with the zinc vapor through passages 24 and passes down flue 17 to the separate condenser for that flue.

In Figs. 10 and 11 a special form of condenser is shown which may be employed in lieu of the condensers shown in Figs. 2 and 3. In Figs. 10 and 11, the vertically disposed flue 20, provided with the heating conductors 28, opens at its lower end into a horizontally elongated condenser 29. The floor of this condenser is provided with a plurality of transverse walls or barriers 30, which form a plurality of troughs extending across the condenser. Between each pair of barriers 30 a wall 31 depends from the roof of the condenser, its lower edge being below the level of the upper edges of adjacent barriers 30. In this way a tortuous path is provided for the vapors passing through the condenser from flue 20 toward outlet stack 27. Each of the troughs is provided at its end with an outlet opening 32 through which the condensation products may be withdrawn.

To guard against too rapid cooling of the vapor while passing through the condenser, and to effect a somewhat selective condensation, with segregation of the resultant condensation products, the condenser may be provided with suitable heating conductors through which heating currents may be passed. In the construction shown, a heating conductor 33 extends along the upper edge of each of the barriers 30, and each of the depending walls 31 is a conductor whose ends extend beyond the side walls of the condenser, as shown in Fig. 10, for connection to a suitable source of electric current.

Figs. 16 and 17 show a modification having a different construction and arrangement of the heating conductors. In this modification, the heating conductors or resistors, are in the form of straight bars 34 which extend horizontally across the furnace with their ends projecting beyond the side walls of the heating chamber and also through the flues 35 and 36, which are formed in the wall of the furnace at the sides of the heating chamber.

Connection between the heating chamber and each flue is effected by providing a groove in the lower side of each of the bars 34, as shown at 37 on the three lower bars 34 of Fig. 16. As an alternative construction, grooves may be provided in the walls separating the heating chamber from flues 35 and 36, as shown at 38 in Fig. 16, where the grooves are located directly under the bars 34.

The construction and arrangement of electrodes shown in Figs. 16 and 17 may be employed in connection with the selective condensers of Figs. 2 and 3, if desired. In Fig. 16 both the flues 35 and 36 communicate with the heating chamber at all levels, but if desired, some of the communicating grooves may be closed so that vapor from an upper level will pass into but one flue, while vapor from a lower level will pass only into the other flue. A construction particularly intended to effect this selective condensation is illustrated in Figs. 18 and 19, where flue 35 is connected by the ports 39 at the upper zone, and flue 36 communicates with the lower zone through ports 40.

Figs. 20 and 21 show a modification with provisions for taking off the vapor at three different levels, or zones, for separate condensation. In this construction, three vertical flues 41, 42 and 43 are provided, connected, respectively, to the lower, the intermediate and the upper levels of the heating chamber, and each leading to its individual condenser 25. The lower ends of the flues 41 and 42 are directed laterally for connection to their respective condensers. Flue 43 communicates with the heating chamber through grooves 44 in the furnace wall under the topmost resistors 34. Flue 42 similarly communicates with the heating chamber through grooves 45, and flue 41 has communication through grooves 46 in the lowermost resistors.

Figs. 22, 23 and 24 show a modification having three separate condensers with flues for directing vapors into these condensers from three different zones of the heating chamber. The heating chamber 47 of the furnace communicates with compartments 48, 49 and 50, formed in one of its side walls, and arranged one above another, as shown. The heating conductors or resistors extend across chamber 47 and also across these compartments. From the two upper compartments 48 and 49 passages lead laterally to vertical flues 51 and 52, respectively, which lead to separate condensers 25. From compartment 50 a flue leads downward to a condenser located at the rear of the furnace.

The heating conductors may be of triangular cross-section, as shown in Fig. 23, so that the ore will pass downward around them more readily. They are arranged in horizontal rows and staggered to insure more intimate contact with the descending furnace charge. If desired, the conductors may be arranged directly under one another in vertical rows instead of being staggered, as shown.

Certain of the conductors 53, shown in Fig. 23, are provided with grooves, preferably triangular in cross-section, in the lower faces thereof. These grooves form passages through which the vapors given off by the ore may flow from the heating chamber into a side compartment. The upper rows of conductors 54 do not have such grooves, but the furnace wall has a groove beneath each conductor, and the downward movement of the ore within the furnace causes a space of triangular shape to form under the conductor through which the vapor may escape from the interior of the furnace to the adjacent side compartment.

Figs. 25, 26 and 27 illustrate a furnace having a rectangular heating chamber 55 about which four condensers 25 are symmetrically grouped. The resistors 56 are of triangular cross-section and arranged in four groups, two of which run from front to back of the furnace, and two of which run from side to side, as shown in Fig. 26. The resistors of each group are arranged in staggered relation and beneath each resistor is a rectangular slot 57 in the wall of the furnace serving as a port or vent through which the vapors may pass out into an appropriate flue leading to one or another of the condensers. There is a separate flue for each of the four condensers and these flues communicate with the heating chamber at four different levels, or zones, to isolate the vapors from any particular zone, as heretofore explained.

All of the various modifications illustrated in Figs. 16 to 27 have many features in common with the furnace illustrated in Figs. 1 to 15, to the description of which reference should be had for a more complete discussion of these features. The special condensers of Figs. 10 and 11 may be used with any of them.

With all of the furnaces disclosed herein, the mode of operation is in most respects the same as that particularly described for the furnace of Figs. 1 to 15.

Figs. 28 to 37 illustrate various forms and groupings of resistors suitable particularly for use in the various furnaces of Figs. 16 to 27. The special condensers of Figs. 10 and 11 may be used with any of them.

In Fig. 28, the resistors 58 are of triangular outline and arranged in staggered relation to insure thorough and gradual agitation and mixing of the charge as it descends through the heating chamber. Beneath each triangular resistor is a triangular pocket 59 into which the charge does not flow, and at the end of which advantageously may be formed the vent or port for conveying the vapors out of the charge to the condenser flue. The two topmost rows of resistors in Fig. 28 have these vents 60 formed by grooves in the wall of the heating chamber, but the two lowermost rows of resistors have grooves 61 along their lower faces through which the vapors can escape.

In the modification illustrated in Fig. 29, the triangular resistors are arranged one above another in tiers, but the resistors of one tier are off-set with respect to adjacent tiers, so that the charge follows a tortuous path as shown. The vents 62 for the topmost row of resistors are of rectangular shape and cut in the wall of the chamber, and for the lowermost resistors of this figure are formed by triangular grooves 63 in the resistors themselves.

In Fig. 30 the resistors 64 are of rectangular outline and arranged in tiers, but their top edges are beveled and the resistors are so off-set with respect to one another that the charge is deflected from side to side during its downward movement. With this modification, as with the triangular resistors, the vents or ports may be in the wall of the chamber beneath the flat face of the resistor, or may be formed by a longitudinal groove in the resistor itself.

Fig. 31 shows two different types of resistors 65 and 66, and with each type the top of the resistor slopes downward to deflect the charge from the adjacent port 67, and the bottom edge is recessed to partially cover the adjacent and underlying port. When using resistors 65 it is possible to have them reinforced and supported by intermediate walls 68 extending across the heating chamber.

Fig. 32 illustrates other permissible forms of resistors and three different groupings thereof. At the left of the figure the resistors 69 and 70 are of rectangular cross-section, each with a beveled corner, and are off-set to give a tortuous path for the descending charge and those resistors which are embedded in the outer wall of the heating chamber are larger in cross-section than those resistors 70 which are seated against the intermediate wall 71, thereby to compensate for the loss of heat by conduction through the outer wall. Through the center of Fig. 32 the opposed conductors are not staggered, but by their arrangement, as shown, serve to alternately expand and compress the charge as it descends through the heated zones. At the extreme right of this figure the form and arrangement is the same as at the extreme left.

Figs. 33 to 37 illustrate resistors of various forms and in various arrangements or groupings, each of these resistors being covered with a refractory envelop 72, such as a suitable fire clay, to thereby lessen oxidation and mechanical wear.

Any of the forms of conductors illustrated in Figs. 28 to 37 can be used in the various furnaces of Figs. 16 to 27 and can be grouped in any of the ways illustrated, as will be understood without further detailed illustration or explanation.

The furnace constructions shown in the several views hereof permit accurate control of the heating of the charge. Because of this, the volatilization of iron contained in the ore may be greatly restricted; in fact, with some ores, the volatilization of iron may be practically eliminated and spelter of a high degree of purity obtained even during the last stages of the operation. But even if the volatilization of a substantial amount of iron should occur in the final stage of the operation, owing to continual increase in the temperature of the charge, as the latter progresses downwardly within the furnace, the contaminating effect of such iron will be confined to the condensation of but one condenser.

While I have described my invention as of special utility in the reduction of zinc ores, I wish it understood that my improved form of furnace is adapted for various uses other than that set forth particularly herein. For instance, such a furnace may be employed in driving off a portion of the sulfur content of certain complex zinc ores in order to permit magnetic separation of the constituents.

I claim:—

1. An electric furnace comprising a vertically disposed heating chamber through which the charge passes downward from the upper admission end to the lower discharge end, electrical resistors for heating the charge within said chamber, a plurality of vapor outlets from said chamber at different levels, and a plurality of condensers connected to said outlets by vertical flues of different heights in the walls of the furnace; substantially as described.

2. An electric furnace comprising a heating chamber through which the charge passes from the inlet to the outlet, electrical resistors distributed along said chamber to heat the charge progressively during its transit therethrough, a plurality of condensers, and a vertical passage connecting each of the condensers to the heating chamber at different zones along the length thereof; substantially as described.

3. An electric furnace comprising a vertically disposed heating chamber through which the charge passes from the upper admission end to the lower discharge end, electrical resistors mounted in said heating chamber and arranged for heating the charge during its downward movement, a plurality of condensers, and separate vertical passages connecting the condensers to the interior of the furnace at different levels; substantially as described.

4. An electric furnace comprising a vertically disposed heating chamber through which the charge passes, electrical resistors distributed along said chamber to heat the charge progressively during its transit therethrough, a plurality of separate condensers, and a vertical flue for each condenser, said flues communicating with said heating chamber at different levels; substantially as described.

5. An electric furnace comprising a vertically disposed heating chamber adapted for the admission of the charge at the upper end thereof and discharge of the residue at the lower end, electric resistors in the path of said charge for heating the same, a plurality of vapor-discharging ports for said heating chamber arranged at different levels, a separate condenser for each level, and a separate vertical flue connecting the discharge ports of each level with its corresponding condenser; substantially as described.

6. An electric furnace comprising a heating chamber through which the charge is caused to travel, a plurality of electrical resistors in the path of said charge for heating the same, a selective condensing apparatus comprising a plurality of separate condensers and vertical flues connecting the same to said heating chamber through ports opening therefrom at different zones, and electric heating devices located near the bottom of each flue for controlling the temperature of vapors passing through said flues to said condensers.

7. An electric furnace comprising a vertically disposed heating chamber adapted for the admission of the charge at the upper end and the discharge of the residue at the lower end, electric conductors within the furnace for heating the charge therein, a plurality of flues of different heights located in the wall of the furnace and each connected at its upper end to the interior of the furnace, and a plurality of condensers each connected to one of the flues; substantially as described.

8. An electric furnace comprising a chamber through which the charge is caused to travel, a plurality of conductors of annular form mounted upon the wall of the chamber and exposed to the interior of the chamber, connections to said conductors for carrying current to and from the same, condensing apparatus, and flues for carrying vapor from the interior of the furnace to the condensing apparatus; substantially as described.

9. An electric furnace comprising a vertically disposed chamber through which the charge is adapted to pass, a plurality of conductors of annular shape formed of moldable conducting material of high resistivity mounted upon the wall of the furnace in vertical alinement and exposed to the interior of the furnace, connections to the conductors for carrying current to and from the same, a plurality of condensers, and flues connecting the condensers to the interior of the furnace at different points in the line of travel of the charge within the furnace; substantially as described.

10. An electric furnace comprising a chamber through which the charge is adapted to pass, a plurality of conductors each having an opening therethrough arranged in alinement upon the wall of the furnace so that the charge will pass through them, a plurality of passages leading from the interior of the furnace between adjacent conductors and a plurality of condensers each connected to one of said passages; substantially as described.

11. An electric furnace comprising a chamber through which the charge is caused to pass, passages for vapor arranged adjacent to the chamber, a plurality of conductors extending across the chamber and into said passages and spaced apart to form passages through which vapor may flow from said chamber to said passages and a plurality of condensers each connected to one of said passages; substantially as described.

12. An electric furnace comprising a chamber through which the charge is caused to pass, a plurality of passages located adjacent to the chamber, a plurality of heating conductors extending across the chamber and into said passages and each grooved on its lower face to provide space through which vapor may flow from the interior of the furnace to one of said passages and a plurality of condensers each connected to one of said passages; substantially as described.

13. An electric furnace comprising a vertically disposed chamber having an inlet opening at its upper end and a discharge opening at its lower end, a plurality of vertically disposed flues in the wall of the furnace, a plurality of electrical resistors extending across the chamber and each entering one of said flues, each of said conductors providing space beneath it for the flow of vapor from the interior of the furnace into one of said flues and a plurality of condensers each connected to one of said flues; substantially as described.

14. An electric furnace comprising a chamber having an inlet opening at its upper end and a discharge opening at its lower end, a plurality of vertically disposed flues of different heights in the wall of the furnace, a plurality of electrical resistors extending across the chamber at different levels and each entering one of said flues, each of said conductors providing space immediately below it for the flow of vapor from the interior of the furnace into one of the flues, and a plurality of condensers each connected to one of the flues; substantially as described.

15. An electric furnace comprising a vertically disposed chamber through which the charge is adapted to pass from the upper admission end to the lower discharge end, a plurality of conductors for heating the charge during its transit through said chamber, a selective condensing apparatus comprising a plurality of condensers and vertican flues connecting the several condensers to said chamber at different levels, and electric heating devices located near the bottom of each flue for controlling the temperature of vapors passing through said flues to the condensers; substantially as described.

16. An electric furnace comprising a chamber through which the charge is adapted to pass, a plurality of conductors of annular form arranged in alinement upon the wall of the furnace so that the charge will pass through them, a plurality of spacers each located between a pair of adjacent conductors and each cut away to provide a passage leading from the interior of the furnace between two adjacent conductors, and condensing apparatus connected to said passages; substantially as described.

17. An electric furnace comprising a chamber through which the charge is caused to pass, passages for vapor arranged adjacent to the chamber, a plurality of resistors extending across the chamber and into said passages and providing covered spaces through which vapor may flow from the interior of the furnace to said passages and a plurality of condensers connected to the interior of the furnace at different levels; substantially as described.

18. An electric furnace comprising a chamber through which the charge is caused to pass, a plurality of resistors extending across the chamber and each having its upper surface oppositely inclined to facilitate movement of the charge within the furnace and condensing apparatus connected to said chamber; substantially as described.

19. An electric furnace comprising a chamber through which the charge is caused to pass, a plurality of resistors extending across the chamber in the path of said passing charge, said resistors being in staggered relation to one another to effect agitation of the charge during its transit through said chamber.

In testimony whereof I affix my signature.

LEWIS G. ROWAND.